United States Patent Office 2,872,329
Patented Feb. 3, 1959

2,872,329

HYDRAULIC CEMENT COMPOSITIONS

Edward W. Scripture, Jr., St. James, Barbados, British West Indies, and Stephen W. Benedict, Cleveland Heights, Ohio, assignors, by mesne assignments, to American-Marietta Company, Chicago, Ill., a corporation of Illinois No Drawing. Application December 14, 1954
Serial No. 475,292

7 Claims. (Cl. 106—92)

This invention relates to hydraulic cement compositions, such as dry cements and concrete or mortar mixes made therefrom, containing ingredients which plasticize the mixes, improve their finishing time, increase their strength at all ages, and lend other desirable properties thereto.

The use of agents such as waste sulfite liquor, for example, to reduce the water-cement ratio of an hydraulic cement mortar or concrete has permitted substantial improvement in the properties of structures formed thereof.

Waste sulfite liquor and its derivatives, for example, are highly effective as cement dispersing agents, which is understood to account in part for their plasticizing action, the permissible reduction in the water-cement ratio, and the resultant increase in the strength of the fully hardened cement. Thus, when small amounts of waste sulfite liquor or the dry residue thereof are added to cement mixes, the water-cement ratio may be reduced a very substantial amount and the strength of the concrete at later ages substantially increased.

However, there are disadvantages connected with the use of the agents heretofore proposed which have in some measure limited the commercial acceptance of the cement compositions containing them. The use of these dispersing or plasticizing agents tends to reduce the strength at early ages, such as 1 to 7 days, to less than that of a plain mortar or concrete mix. Also, where surface finishing is required, as in constructing floor slabs and the like, these plasticizing agents tend to prolong the time before the cement begins to set and can be surface finished. Moreover, the amounts of these plasticizing agents, in many instances, must be carefully controlled to obtain the optimum results. This may cause difficulties in commercial operations because of the crude measuring methods often employed, the difficulty of obtaining uniform mixing of the small amounts of such additives, etc.

A number of efforts have heretofore been made to provide improved plasticizing agents derived from waste sulfite liquor. Thus, the art has tried various chemical modifications thereof, various purification processes for removing deleterious components therefrom, and the addition thereto of one or more other chemicals for supplementing the action of the plasticizing agents in some respect or for counteracting their objectionable characteristics. In all such instances with which we are familiar, however, elimination of one or more of the above objections has introduced new disadvantages or has reduced the usefulness of these plasticizing agents in other respects, as by reducing the strengths of the cement mixes at later ages, increasing their cost to a prohibitive degree, or simply lowering their general effectiveness for their intended purpose.

The general objects of the present invention are to provide improved hydraulic cement additives which possess the desirable properties of prior additives derived from waste sulfite liquors but do not have the disadvantages of the prior additives, and to provide hydraulic cement mixes containing the improved additives and methods of utilizing the improved additives.

More specifically, it is an object of this invention to produce special hydraulic cement mixes which, compared to plain mixes, have improved strength at all ages and an equal or accelerated rate of hardening using a given cement factor and a reduced water-cement ratio, and to produce additives for hydraulic cement mixes which will give the mixes these desirable properties to a higher degree than has heretofore been possible.

Another more specific object of this invention is to produce such improved hydraulic cement additives, and cement mixes containing the same, by a simple and relatively inexpensive treatment of waste sulfite liquors, and by simple addition of the additives to the cement mixes.

We have found that the above and other objects, which will be apparent from the following description of the invention, may be accomplished by incorporating in hydraulic cement mixes waste sulfite liquor derivatives remaining in the liquid after passing commercial waste sulfite liquor, with or without prior neutralization and/or purification, into intimate contact with a bed of a so-called "ion exchange resin." This term is well understood in the art as identifying a class of acidic or basic, solid, resinous compounds which have the ability to exchange free cations or anions in the resins for other anions or cations contained in fluids passed into intimate contact with the resins. These resins normally become exhausted in due course, but may be regenerated by contact with fluids containing the anions or cations to be replaced in the resins.

However, as used in carrying out the present invention, regeneration of the resins after long use is not necessary and, in fact, is detrimental, though periodic cleaning of the resins is required, as will hereinafter be explained. Thus, the effects of the treatment of waste sulfite liquor with ion exchange resins, which effects are responsible for the improvement of the waste sulfite liquor for use as a hydraulic cement additive, are attributable to some action of the resins other than the ion exchange reactions for which such resins are normally used. Though the effects responsible for the improvement are presently quite obscure, we have found that the spent, unregenerated, ion exchange resins still remove substantial amounts of certain unidentified components from the waste sulfite liquor. This removal, which may be accomplished by the process of adsorption on the ion exchange resins, is evidenced by loss of from about 15% to 40% or so of the dissolved solids which were present in the waste sulfite liquor prior to treatment with the ion exchange resin.

Another circumstance which indicates that the success of the invention is dependent upon a phenomenon other than an actual ion exchange reaction is that the common ion exchange resins, including different kinds of both anion and cation exchange resins, are effective for the purposes of the invention, though not all to the same degree. Since any ion exchange reaction promoted by a cation exchanger would necessarily be entirely different from an ion exchange reaction promoted by an anion exchanger, the invention would appear to be independent of the occurrence of any ion exchange reaction for this additional reason.

The components of the waste sulfite liquor removed by the ion exchange resins have been difficult to ascertain because of the very complex mixture of many different high molecular weight organic compounds present in the original liquor, many of which have never been definitely identified. However, we have found that some carbohydrates are removed when using an ion exchange resin to treat a waste sulfite liquor, even when a substantial portion of the carbohydrates has previously been removed by fermentation, dialysis, or other methods.

The amount of additional carbohydrates removed by the ion exchange resin may range from close to half the residual carbohydrate content, when using an active ion exchange resin, to a very small fraction of the residual carbohydrate content when using a spent, unregenerated, ion exchange resin, or one which is merely inactive as an ion exchanger for the particular liquor being treated. Because the effectiveness of the treated liquor is as great or somewhat greater in the latter case than in the former, it appears that the removal of residual carbohydrates is not the essential factor in determining the properties of the treated liquor as a cement additive. Apparently some other component or components of the original waste sulfite liquor, which have not yet been isolated or identified, are also removed or altered to bring about the improvement which results.

The waste sulfite liquors of commerce are generally available only in a neutralized form, having been "limed" to convert the acids therein to their calcium salts. The term "waste sulfite liquor" as used herein is intended to include both the neutralized and unneutralized forms thereof. Use of the neutralized liquors is preferred for the purposes of the present invention. However, the same kind of improvement results whether or not the waste sulfite liquor employed has first been neutralized.

It is desirable that a substantial portion of the carbohydrates be removed from the waste sulfite liquor before it is treated with the ion exchange resin. This may be accomplished by removing the fermentable sugars, as disclosed in U. S. Patent 2,435,594 to MacPherson, though other purification procedures to remove a portion of the carbohydrates may be employed.

When neutralized waste sulfite liquor is to be treated with an ion exchange resin in accordance with the present invention, with or without prior purification, it is preferred to use an anion exchanger rather than a cation exchanger so as to avoid removal of the calcium ions generally present in the liquor as a result of neutralization.

So long as the ion exchange resin employed is an active ion exchanger with respect to any component of the liquor being treated, it will, of course, cause an ion exchange reaction to occur. This does not destroy or seriously impair the value of the treated liquor as a cement additive for the above stated purposes of the invention, though it tends to produce premature stiffening of the cement mix and is generally undesirable for this reason. Accordingly, once the ion exchange resin has become spent or exhausted, it is preferably not regenerated in the customary manner and may be used indefinitely thereafter without regeneration, though cleaning of the resin is required periodically in the manner hereinafter described.

Instead of starting with an ion exchange resin which is in an active ion exchange state with respect to the liquor being treated, we prefer to start with a resin which is essentially inactive as an ion exchanger with respect to the particular liquor being treated. For example, when a liquor that has been neutralized with calcium is treated with a cation exchange resin, the replaceable cation of the resin may be calcium rather than, say sodium, so that calcium ions will not be removed from the liquor. Similarly, when treating an unneutralized liquor with an anion exchange resin, one may be selected which is in such a condition that it will not remove anions from the liquor.

As noted above, the various kinds of ion exchange resins all appear to be operative to varying degrees to effect the desired improvement in the properties of waste sulfite liquors for the purposes of this invention. These ion exchange resins may be described as insoluble, high molecular weight, polymeric electrolytes. The cation exchange resins, as is well recognized, owe their capacity for exchanging ions to such functional groups as the sulfonic, carboxylic, phenolic, phosphonic, and phosphinic groups. The anion exchange resins owe their capacity for exchanging ions to the presence of replaceable hydroxyl groups.

While many authorities once considered the exchange mechanism of anion exchange resins to involve mere covalent adsorption of acid, it has been amply demonstrated that these ion exchange resins are polyamines in which the amine groups have reacted with a hydronium ion ($H_3O^+$), and that a hydroxyl group exists in the hydronium radical somewhat disassociated from the substituted ammonium ion. This hydroxyl group is apparently exchangeable for other anions.

However, all of the anion exchange resins with which we are familiar are of the amine type, and, since the ion exchange phenomenon is only of incidental interest insofar as the present invention is concerned, it is sufficient for an understanding of the scope of the present invention to recognize that the class of anion exchange resins consists of the class of insoluble, high molecular weight, polymeric electrolytes having amine functional groups.

Thus, the broad class of ion exchange resins useful for the purposes of the present invention may be defined as the insoluble, high molecular weight, polymeric electrolytes having ionic functional groups selected from the class consisting of substituted and unsubstituted sulfonic, carboxylic, phenolic, phosphonic, phosphinic, and amine groups (the latter being used to designate primary, secondary, tertiary, and quaternary amine groups). The expression "substituted and unsubstituted" is used in the above definition because the functional group is not relied upon in this case for its ion exchange ability. Therefore, the functional groups may be unsubstituted, or they may have a suitable cation or anion substituted respectively for a hydrogen or a hydroxyl group, such cation or anion being either replaceable or not replaceable by a cation or anion from the waste sulfite liquor to be treated.

For example, if a cation exchange resin for use in accordance with the present invention is represented by the formula—

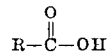

R represents the high molecular weight resin radical, and the carboxyl group represents the functional group in the above definition. In this functional group, the hydroxyl radical may be substituted by a sodium ion, which would be replaceable by a calcium ion from the waste sulfite liquor, or it may be substituted by a calcium ion, which would not be replaceable when contacted by a waste sulfite liquor having only calcium cations available for exchange.

Similarly, if an anion exchange resin for use in accordance with the present invention is represented by the formula—

the amino hydrogens may or may not be substituted by a replaceable anion, such as $OH^-$, $Cl^-$, $SO^-$, or the like. Depending upon the particular anion substituted for hydrogen, it may or may not be replaceable by anions present in the waste sulfite liquor to be treated.

We have found that, in general, the anion exchange resins are superior for the purpose of the present invention. Examples of anion exchange resins which are presently preferred are the following exchangers sold by Rohn & Haas Co., Resinous Products Division, Philadelphia, Pennsylvania:

"Amberlite IRA—400"
"Amberlite IRA—401"
"Amberlite IRA—410"   } Strongly basic, quaternary amine type
"Amberlite IRA—411"

Other anion exchangers of commerce which have been found to be effective for the purposes of the invention are:

"Dowex 1"
"Dowex 2"
"Nalcite SAR"
"Nalcite SBR"
"Amberlite IR-4B"

These five are all of the polystyrene quaternary amine type, the first four being strongly basic and somewhat superior to the last, which is weakly basic. The first two are sold by Dow Chemical Co., the next two by National Aluminate Corp., Chicago, Illinois, and the last by Rohm & Haas.

The presently preferred cation exchange resin is "Amberlite IR-112" (a polystyrene nuclear sulfonic acid type), also sold by Rohm & Haas Co.

Other cation exchangers of commerce which have been found to be effective for the purposes of the invention are:

"Dowex 50" (Dow Chemical Co.)
"Amberlite IR-120" (Rohm & Haas Co.)
"Nalcite HCR" (National Aluminate Corp.)

All of these last three are styrene-divinyl benzene copolymers having varying degrees of cross-linking.

The preferred method of treating waste sulfite liquors and their derivatives with ion exchange resins is to pass the liquors through a resin bed contained in a column. The column may be of any conventional design heretofore used for ion exchange reactions. Alternatively, of course, a batch operation may be employed in which the whole of a batch of liquor to be treated is contacted at once in a suitable tank by a mass of the ion exchange resin, the solid and liquid phases being separated by means of filtration, decantation, centrifugation, or the like. As is well recognized, however, this is a most inefficient procedure compared to the columnar operation, which is essentially a multiple batch procedure in which the uppermost portion of the column is constantly contacting fresh electrolyte, whereas the lower portions of the column contact the remainder of the liquor not absorbed or otherwise extracted by the uppermost portion.

The rate of flow through a column, or period of contact in other apparatus, may be varied widely with the concentration of the liquor being treated, with the porosity of the mass of ion exchange resin, with the effectiveness of the particular resin employed, and with other factors which may be varied at will. The concentration of the liquor does not seem to have any effect upon the efficiency of the treatment, except that higher concentrations require longer contact and appear to make cleaning of the resins more difficult.

The columnar or other contact of the resins with the liquor tends to accumulate impurities on the resins and to clog the pores thereof. Thus, it is desirable to clean the resins periodically, as needed, for example by washing them first with a solution of about 4% sodium hydroxide, then with water, and then with a solution of about 2% sodium hypochlorite or others similar oxidizing agent, followed by a final washing with water. When used to treat waste sulfite liquors having a higher solids content (above about 20%), the ion exchange resins are more difficult to clean and may require additional washing with a 4½% solution of nitric acid, followed by a final water-wash. Such a washing of the resins with these low concentrations of washing solutions is preferably not carried out for a sufficient period of time to effect any substantial generation of the resins, whether of the cation or anion type. However, as noted above, the only substantial effect of regeneration of any of the operative resins seems to be an as yet unexplainable tendency of the treated liquors to cause premature stiffening of cement mixes to which they are added.

The solids remaining dissolved in the treated liquor or effluent may be used directly as a solution of any desired concentration, or may be reduced to the form of a paste or dry powder before use, whichever is more convenient or economical in any particular case. The product may be added to cement or ground with it at the time of its manufacture. Alternatively, and often more conveniently, it may be added, either alone or in admixture with other materials, to the cement, to the aggregate, to the water, or to any other part or parts of a cement mix, at any time up to completing the mix for placement.

The principal component of waste sufite liquor solids is lignosulfonic acid, or a salt thereof when the liquor has been neutralized. This component has long been considered to be the active component of such liquors which is responsible for the improvement of hydraulic cement mixes. As noted above, the amounts of various modified forms of waste sulfite liquors which should be used in a particular case may be quite critical, and to materially exceed those limits may have harmful results. The proper amounts to be used depended, not only upon the effect desired, but also upon the liquor modification involved and the lignosulfonic acid or salt content of such modified liquors.

One of the special advantages of liquors modified in accordance with the present invention is that the adverse effects of prior modified liquors have been greatly minimized. As a result, the adverse effects of using excessive amounts have been greatly reduced and the amounts used are correspondingly less critical.

As little as 0.05% of the solids of the treated liquor, based on the weight of hydraulic cement in a mix, will produce significant improvement in ultimate strength with no reduction and sometimes an actual increase in early strengths and rate of hardening. Below 0.05%, the benefits of the invention may be detectable but become insignificant. As much as 1.0% of the treated liquor solids, based on the weight of hydraulic cement, may be used. Though there may be instances in which the use of larger amounts is desired, the additional improvements achieved with larger amounts are less than proportional to the increase in the additions and are generally uneconomical. Too great an excess, of course, can be harmful and should be avoided. In general, from about 0.25% to about 0.75% of the treated liquor solids, based on the weight of hydraulic cement in a mix, is preferred.

When unpurified calcium lignosulfonate is added to a concrete mix in amounts which effectively disperse the cement and reduce the amount of water required to produce a plastic concrete mix, the setting of the cement and the early rate of hardening are retarded. It has been the practice to add to the mix, along with the waste sulfite liquor, an accelerator, such as calcium chloride. With the use of partially purified waste sulfite liquors such as those secured from fermentation processes which remove more or less of the fermentable carbohydrates, this retarding effect is greatly reduced; but when the larger proportions of such liquors are used, the retarding effect persists. Thus, while it is possible by certain prior art liquor treatments to reduce the amount of calcium chloride needed to maintain normal setting time and early rate of hardening, some calcium chloride is still required. The use of calcium chloride in concrete is not generally regarded as desirable, and some published data indicate that calcium chloride aggravates the alkali-aggregate reaction in concrete. We have found the treatment of waste sulfite liquors and the like by passage through ion exchange resins permits these materials to be used in concrete without the addition of calcium chloride while still maintaining or accelerating the finishing time of the concrete, its setting time, and its early rate of hardening, and while also securing the maximum benefits from dispersion of the cement.

However, it is sometimes desired to increase the rate of hardening of cement mixes beyond that which can be achieved with the treated waste sulfite liquors of this invention. Calcium chloride or other known accelerators may be used for this purpose in conjunction with these treated liquors. The desirable amounts of acelerator are usually from about 0.1% to 2% or 2.5%, by weight of the cement.

Additional ingredients, such as fly ash and other finely divided materials, may also be present in the concrete to improve workability or provide pozzuolanic action. If it is desired to further increase the ultimate strength of the concrete or mortar, it may be desirable also to incorporate a derivative of benzoic acid, such as those disclosed for this purpose in United States Patents Nos. 2,264,336, 2,360,517, 2,360,518, and 2,360,518. The preferred derivative of benzoic acid is salicylic acid or a salt thereof.

The practice of using air entraining agents in cement mixes is now well understood and commonly used for increasing the resistance of hardened concrete to freezing and thawing and to scaling on de-icing with calcium chloride and the like. The treated liquors of this invention do entrain air, and the amount of entrained air frequently falls within the desirable range of 3% to 6% by volume. Under some conditions, or in some mixes, these liquors may not entrain the desired amount of air, and it may be desired to entrain more air by the use of additional air entraining agents, such as an alkylphenyl sulfonate, described in U. S. Patent No. 2,593,492, or other air entraining agents such as those described in U. S. Patents Nos. 2,225,149, 2,225,150, 2,420,144, 2,236,251, and others.

Similarly, other additives may be included in cement mixes prepared in accordance with this invention for the purposes for which they are normally employed. The expression "consisting essentially of" recited in the claims is intended to be used accordingly.

In the light of the foregoing general disclosure of this invention, the practical application and advantages thereof will be better understood from the following specific examples:

*Example 1*

Two separate mixes were prepared, each mixture comprising cement, sand and coarse aggregate, and water to produce a nominal slump of 3 inches. Mix No. 1, with a nominal cement factor of 5½ sacks per cu. yd., served as a control and did not contain any special addition. To mix No. 2 was added ½ lb. per sack of cement of waste sulfite liquor solids derived from the effluent resulting from the passage of a waste sulfite liquor solution, from which the carbohydrates had been partially removed by fermentation, through the above identified anion exchange resin, "Amberlite IRA-410," in ungenerated condition. From each concrete mix 6" x 12", cylinders were prepared and tested for compressive strength, in accordance with standard procedure. The pertinent data, including water-cement ratio (W./C.) in terms of gallons of water per sack of cement, cement factor (C. F.) in terms of sacks of cement per cu. yd. of concrete, plasticity as measured by the slump, air contents measured in a Washington type air meter, and compressive strengths at 1, 7, and 28 days, are shown in the following table:

| Mix No. | Slump, in. | C. F., sks./ cu. yd. | W./C. gals./sk. | Air, Percent | Compressive Strength, p. s. i. | | |
|---|---|---|---|---|---|---|---|
| | | | | | 1 day | 7 days | 28 days |
| 1 | 2½ | 5.47 | 6.66 | 1.7 | 750 | 2,970 | 4,110 |
| 2 | 3½ | 4.69 | 6.46 | 3.3 | 770 | 3,810 | 5,370 |

It will be seen that, even with a substantially lower cement content, the mix to which the treated waste sulfite liquor solids were added showed about the same strength at 1-day as the mix without addition, and very much higher strengths at 7 and 28 days. This improvement was achieved in spite of the fact that the mix to which the treated waste sulfite liquor solids were added entrained a significant amount of air, which usually lowers strength.

*Example 2*

Three separate mixtures were prepared, each mixture comprising cement, sand and coarse aggregate, and water to produce a nominal slump of 3½ inches. Mix No. 1, with a cement factor of 5½ sacks per cu. yd., served as the control and did not contain any special addition. To mix No. 2, with a nominal cement factor of 4.7 sacks per cu. yd., was added ¼ lb. per sack of cement of waste sulfite liquor solids treated by passage through the above identified anion exchange resin, "Amberlite IRA-410." To mix No. 3, with a nominal cement factor of 4.7 sacks per cu. yd., was added ¼ lb. per sack of cement of waste sulfite liquor solids treated by passage through the above identified anion exchange resin, "Amberlite IRA-400." Both ion exchangers were used in an ungenerated condition. From each concrete mix 6" x 12" cylinders were prepared and tested for compressive strengths, in accordance with standard procedures. The pertinent data, including water-cement ratio (W./C.) in terms of gallons of water per sack of cement, cement factor (C. F.) in terms of sacks of cement per cu. yd. of concrete, plasticity as measured by the slump, entrained air content measured by the Washington type air meter, and compressive strengths at 1, 7, and 28 days, are shown in the following table:

| Mix No. | Slump, in. | C. F., sks./ cu. yd. | W./C., gals./sk. | Air, Percent | Compressive Strength, p. s. i. | | |
|---|---|---|---|---|---|---|---|
| | | | | | 1 day | 7 days | 28 days |
| 1 | 3½ | 5.50 | 6.14 | 1.7 | 620 | 3,280 | 5,360 |
| 2 | 3½ | 4.70 | 5.90 | 4.1 | 630 | 3,810 | 5,550 |
| 3 | 4 | 4.71 | 5.76 | 4.1 | 620 | 3,870 | 5,480 |

It is again seen that, with a substantially lower cement factor, the mixes to which the treated waste sulfite liquor solids were added had strengths approximately equal to that of the mix without addition at 1-day, and substantially higher strengths at 7 and 28 days. The strengths of the mixes to which the treated waste sulfite liquor solids were added were approximately the same for the treatments with the two different resins.

*Example 3*

For comparing two cation exchange resins with one of the above anion exchange resins, four separate mixes were prepared. Each mixture comprised cement, sand and coarse aggregate, and water, the proportions being selected in this case to give close to the same strengths at late ages in order also to illustrate the savings in cement which result from the invention. Mix No. 1 served as a control and did not contain any special addition. To mixes Nos. 2, 3, and 4, were added .475 lb. per sack of the same desugarized waste sulfite liquor solids used in Examples 1 and 2, treated with different ones of the above identified ion exchangers. The ion exchangers used for these mixes were:

| Mix No. | Ion Exchanger | Type |
|---|---|---|
| 2 | "Dowex 50" | Cation. |
| 3 | "Amberlite IR-112" | Do. |
| 4 | "Amberlite IRA-410" | Anion. |

Cylinders were made from all four mixes and tested as before with the following results:

| Mix No. | Slump, in. | C. F., sks./cu. yd. | W./C., gals./sk. | Air, percent | Compressive Strength, p. s. i. | | |
|---|---|---|---|---|---|---|---|
| | | | | | 1 day | 7 days | 28 days |
| 1 | 3 | 5.44 | 6.61 | 1.7 | 710 | 3,020 | 5,000 |
| 2 | 5½ | 4.51 | 5.80 | 8.0 | 490 | 3,220 | 5,060 |
| 3 | 4½ | 4.59 | 5.53 | 7.2 | 590 | 3,860 | 5,500 |
| 4 | 3 | 4.62 | 5.55 | 6.6 | 650 | 3,860 | 5,680 |

From the above results it will be observed that, compared to the plain mix No. 1, mixes Nos. 2, 3, and 4 all gave some improvement in strength at late ages while using substantially lower cement factors ("C. F.") and somewhat lower water-cement ratios ("W. C."), even though they entrained considerably greater amounts of air. It will also be observed that mixes Nos. 2 and 3, involving additions treated with cation exchangers, though far superior to mix No. 1 in the respects mentioned, were not as good as mix No. 4 involving an addition treated with a preferred anion exchanger.

*Example 4*

In order to compare the effectiveness of generated and ungenerated ion exchange resins for the purpose of the invention, five separate mixes were prepared. Each mix comprised cement, sand and aggregate, and water. Mix No. 1, with a nominal cement factor of 5½ sacks per cu. yd. and a nominal water/cement ratio of 6 gal. per sack, served as a control and contained no special additive. To mixes Nos. 2 and 3 were added ¼ lb. and ½ lb. per sack of cement, respectively, of waste sulfite liquor solids derived from the effluent resulting from the passage of a waste sulfite liquor solution, from which the carbohydrates had been partially removed by fermentation, through the above identified anion exchange resin, "Amberlite IRA-410," in a generated condition. To mixes Nos. 4 and 5 were added ¼ lb. and ½ lb. per sack of cement, respectively, of waste sulfite liquor solids derived in the same manner except that the anion exchange resin was ungenerated. The nominal cement factors in mixes 2, 3, 4, and 5 were the same, and were substantially lower than for the control mix No. 1. The water/cement ratios were essentially the same in mixes Nos. 1, 2, and 3, but were reduced somewhat in mixes Nos. 4 and 5 to compensate at least partially for the greater effects of the treated additives in those mixes. From each mix, cylinders were prepared and tested as above, with the following results:

| Mix No. | Slump, in. | C. F., sks./cu. yd. | W./C., gals./sk. | Air, percent | Compressive Strength, p. s. i. | | |
|---|---|---|---|---|---|---|---|
| | | | | | 1 day | 7 days | 28 days |
| 1 | 4½ | 5.51 | 6.04 | 1.7 | 570 | 3,090 | 5,200 |
| 2G [1] | 4½ | 4.65 | 6.08 | 4.7 | 390 | 3,010 | 5,060 |
| 3G [1] | 4½ | 4.73 | 5.65 | 4.1 | 370 | 3,470 | 5,690 |
| 4U [2] | 6 | 4.69 | 5.72 | 4.7 | 400 | 3,350 | 5,410 |
| 5U [2] | 6 | 4.65 | 5.13 | 6.9 | 330 | 3,360 | 5,690 |

[1] Additive treated with generated resin.
[2] Additive treated with ungenerated resin.

From the above results, it will be observed that, taking into account their lower cement factors and higher air contents, mixes 2, 3, 4, and 5 all showed the beneficial effects from the additives which they contained. However, it is apparent that the additive prepared with the ungenerated resin (in mixes 4 and 5) was notably more effective than the additive prepared with the generated resin (mixes 2 and 3). Also, mixes 2 and 3 stiffened more quickly after mixing, which may be undesirable for some applications of the invention in practice.

Finishing time data was not included in the foregoing examples in the interest of brevity in the tables of results. However, in all cases, the additives either caused substantially no change in the finishing time or caused a slight reduction in the time required for the mixes to set to a finishing condition. In this connection, it should be noted that 1 day strengths are no measure of finishing time, and that reduction in 1 day strength does not indicate greater finishing delay.

From the foregoing description and examples of the present invention, it will be appreciated that we have provided a method of treating waste sulfite liquors in a simple and inexpensive manner whereby the value of the liquor solids as hydraulic cement additives is greatly enhanced in that the beneficial effects of plain waste sulfite liquor solids are obtained to a high degree without the prior disadvantages.

While the invention has been described and illustrated by reference to various specific materials and procedures, it is to be understood that the invention is not restricted to the particular materials and procedures selected for that purpose. Numerous variations in such details can be employed, as will be appreciated by those skilled in the art.

Having described our invention, we claim:

1. A hydraulic cement mix consisting essentially of Portland cement, sufficient water to effect hydraulic setting of the cement and produce a workably plastic mix, and from about 0.05% to 1.0% based on the weight of cement, of the solids of an effluent resulting from passing waste sulfite liquor into intimate contact with an ion exchange resin until between about 15% and 40% of the solids in said liquor have been removed.

2. A hydraulic cement mix consisting essentially of Portland cement, sufficient water to effect hydraulic setting of the cement and produce a workably plastic mix, and from about 0.25% to 0.75% based on the weight of cement, of the solids of an effluent resulting from passing waste sulfite liquor into intimate contact with an ion exchange resin until between about 15% and 40% of the solids in said liquor have been removed.

3. A hydraulic cement mix according to claim 1 in which said ion exchange resin is a solid, insoluble, high molecular weight electrolyte having ionic functional groups selected from the class consisting of substituted and unsubstituted sulfonic, carboxylic, phenolic, phosphonic, phosphinic, and amine groups.

4. A hydraulic cement mix according to claim 1 in which said waste sulfite liquor is the product resulting from the removal of a substantial portion of the carbohydrates from limed waste sulfite liquor.

5. A hydraulic cement mix according to claim 1 in which said ion exchange resin is a solid, insoluble, high molecular weight electrolyte having substituted amine functional groups.

6. A hydraulic cement mix according to claim 1 in which said waste sulfite liquor is the product resulting from the removal of a substantial portion of the carbohydrates from limed waste sulfite liquor and in which said ion exchange resin is a solid, insoluble, high molecular weight electrolyte having ionic functional groups selected from the class consisting of substituted and unsubstituted sulfonic, carboxylic, phenolic, phosphonic, phosphinic, and amine groups.

7. A hydraulic cement mix according to claim 1 in which said waste sulfite liquor is the product resulting from the removal of a substantial portion of the carbohydrates from limed waste sulfite liquor, and said ion exchange resin is a solid, insoluble, high molecular weight electrolyte having ionic functional groups selected from the class consisting of substituted and unsubstituted quaternary amine groups.

(References on following page)

References Cited in the file of this patent

UNITED STATES PATENTS

| | | |
|---|---|---|
| 1,764,600 | Baker | June 17, 1930 |
| 2,229,311 | Scripture | June 21, 1941 |
| 2,435,595 | MacPherson | Feb. 10, 1948 |
| 2,690,975 | Scripture | Oct. 5, 1954 |
| 2,710,254 | Van Blaricom et al. | June 7, 1955 |
| 2,710,255 | Van Blaricom et al. | June 7, 1955 |

FOREIGN PATENTS

| | | |
|---|---|---|
| 519,848 | Great Britain | Apr. 8, 1940 |